(12) United States Patent
Hadfield et al.

(10) Patent No.: US 10,545,508 B2
(45) Date of Patent: Jan. 28, 2020

(54) MANAGING SYNCHRONIZED MOVEMENT OF A SET OF VEHICLES

(71) Applicant: International Business Machines Corporation, Armonk, NY (US)

(72) Inventors: Matthew J. Hadfield, Cambridge (GB); David Hlavatý, Cambridge (GB); Ariana I. Hlavatý, Cambridge (GB)

(73) Assignee: International Business Machines Corporation, Armonk, NY (US)

( * ) Notice: Subject to any disclaimer, the term of this patent is extended or adjusted under 35 U.S.C. 154(b) by 102 days.

(21) Appl. No.: 15/252,667

(22) Filed: Aug. 31, 2016

(65) Prior Publication Data
US 2018/0059684 A1 Mar. 1, 2018

(51) Int. Cl.
*G05D 1/02* (2006.01)
(52) U.S. Cl.
CPC .................... *G05D 1/0287* (2013.01)
(58) Field of Classification Search
CPC .................... G05D 1/0287; G05D 1/0288
See application file for complete search history.

(56) References Cited

U.S. PATENT DOCUMENTS

| | | | |
|---|---|---|---|
| 6,282,468 B1 | 8/2001 | Tamura | |
| 7,027,772 B2 | 4/2006 | Chen et al. | |
| 7,979,198 B1 | 7/2011 | Kim et al. | |
| 8,229,663 B2 | 7/2012 | Zeng et al. | |
| 8,352,111 B2 | 1/2013 | Mudalige | |
| 8,744,661 B2 | 6/2014 | Horn | |
| 2013/0060456 A1 | 3/2013 | Pourparhizkar | |
| 2014/0129075 A1* | 5/2014 | Carleton | G05D 1/0293 701/27 |
| 2016/0054735 A1* | 2/2016 | Switkes | G08G 1/22 701/23 |

OTHER PUBLICATIONS

Nelson, "How Connected Cars Will Optimize Traffic Flow," NetworkWorld, http://www.networkworld.com/article/2911456/big-data-business-intelligence/how-connected-cars-will-optimize-traffic-flow.html, Apr. 21, 2015, pp. 1-5.

(Continued)

*Primary Examiner* — Aaron L Troost
(74) *Attorney, Agent, or Firm* — Richard A. Wilhelm

(57) ABSTRACT

Method and system for managing synchronized movement of a set of vehicles. Based on a set of parameters and goals for a vehicle having an agent component, negotiating with one or more other vehicles to form a coalition of vehicles with a set of common parameter values and common goals. The method may: synchronize with the other vehicles in the coalition to result in a positioning of the vehicle in relation to the other vehicles and to synchronize time; combine the agent component of the vehicle with one or more agent components of the other vehicles in the coalition to form a distributed agent system; control the coalition of vehicles with common commands from the distributed agent system in response to feedback from sensors in each of the vehicles; and enable an override of the coalition by the vehicle agent component in response to a breach of safety parameters.

10 Claims, 12 Drawing Sheets

(56) References Cited

OTHER PUBLICATIONS

Hudson, "The Car That Automatically Navigates Traffic Jams," The Telegraph, http://www.telegraph.co.uk/motoring/road-safety/9356164/The-car-that-automatically-navigates-traffic-james.html, Jun. 26, 2012, pp. 1-2.

Liu et al., "Motion Coordination of Multiple Autonomous Vehicles in Dynamic and Strictly Constrained Environments," IEEE, Conference Proceeding, Proceedings of the IEEE Conference on Cybernetics and Intelligent Systems, 2006, https://opus.lib.uts.ede.au/handle/10453/2671, pp. 1-3.

Vanderveen, "Interview: Connected Vehicles and Intelligent Traffic Management," GT Magazine, http://www.govtech.com/transportation/GT-Interview-Connected-Vehicles-and-Intelligent-Traffic-Management.html, Jul.-Aug. 2016, pp. 1-5.

\* cited by examiner

FIG. 1
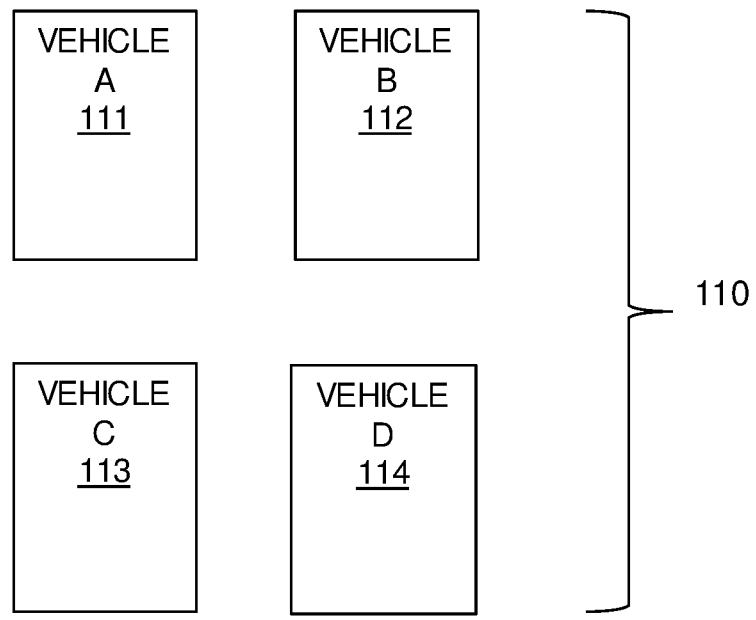
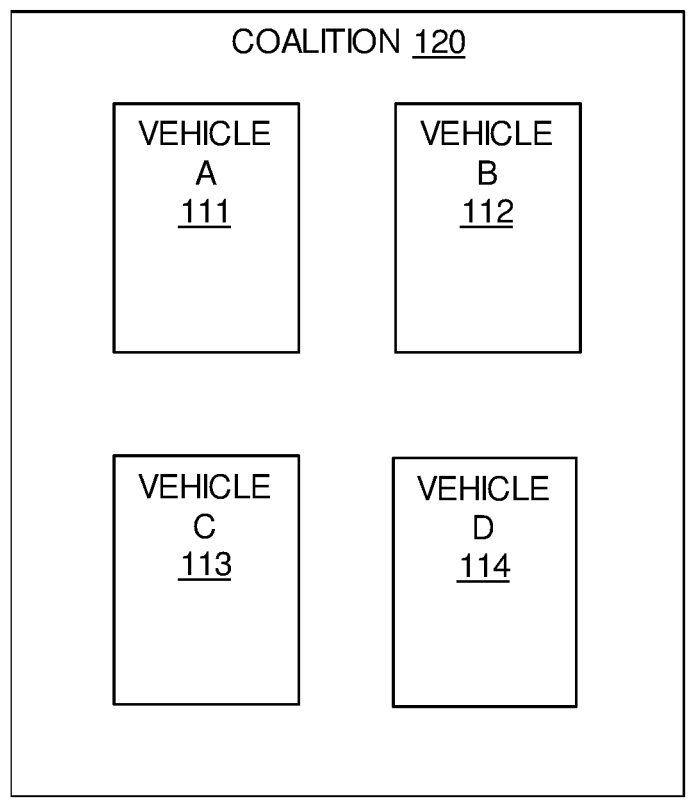

FIG. 6
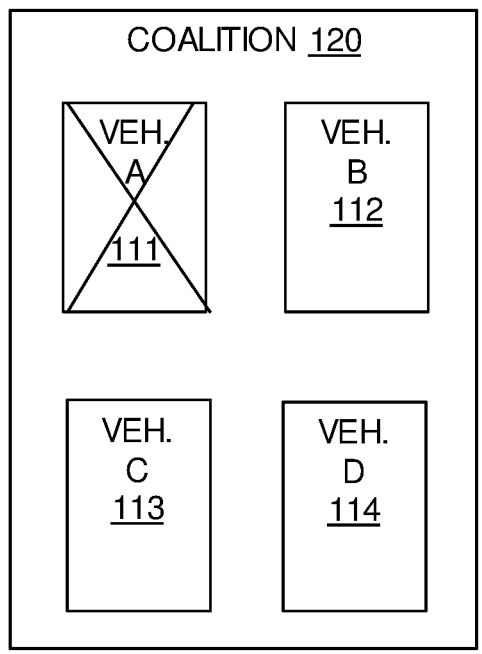
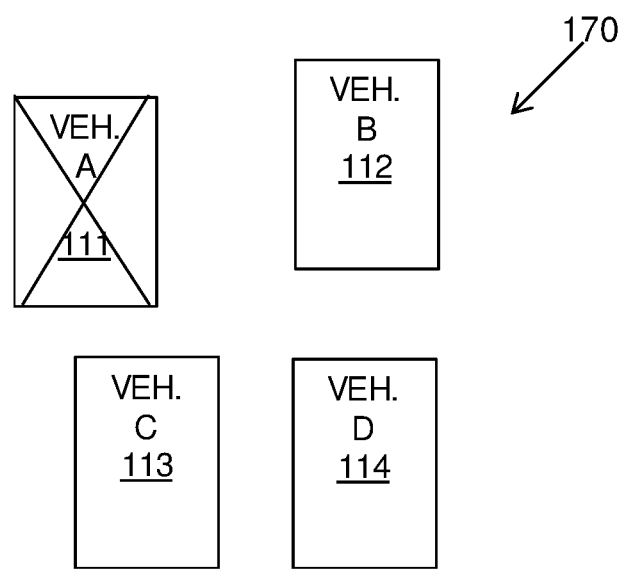

FIG. 7
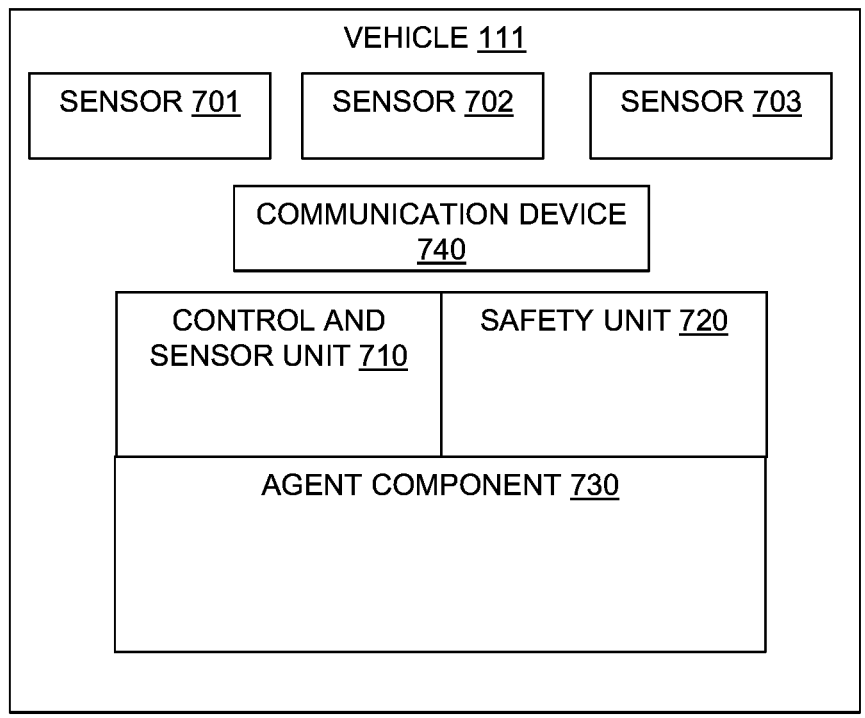
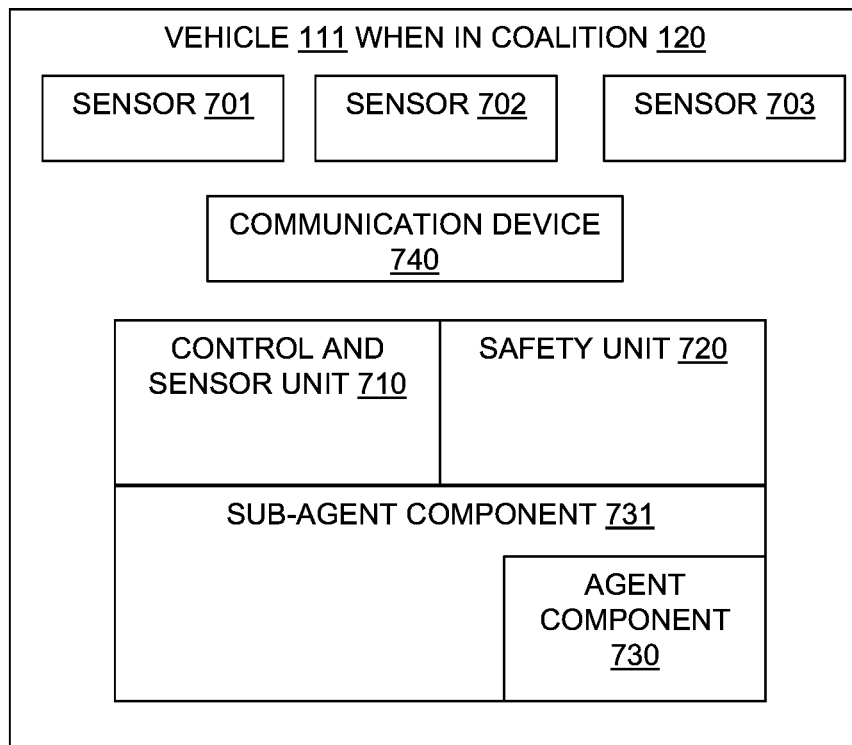

MANAGING SYNCHRONIZED MOVEMENT OF A SET OF VEHICLES

BACKGROUND

The present invention relates to managing synchronized movement of a set of vehicles.

Traffic congestion is becoming more of an issue day after day as the number of vehicles on the road is increasing.

The situation is often made much worse due to the delay between when a vehicle can start moving or modifying its speed, and when it actually starts moving or modifying its speed. This delay propagates vehicle by vehicle all the way down to the end of a queue creating a ripple effect. The vehicle at the very end of the queue starts moving much later than it potentially could if all the vehicles started moving at exactly the same time. Removing this ripple effect may improve the fluency of traffic and reduce the impact of traffic congestion, resulting in smarter transport.

SUMMARY

According to a first aspect of the present disclosure there is provided a computer-implemented method for managing synchronized movement of a set of vehicles wherein the method is carried out at a vehicle having an agent component. The method may include, based on a set of parameters and goals for the vehicle, negotiating with one or more other vehicles to form a coalition of vehicles with a set of common parameter values and common goals, wherein a coalition aims to achieve the common goals whilst respecting the common parameters. The method may also include synchronizing with the other vehicles in the coalition to result in a positioning of the vehicle in relation to the other vehicles in the coalition and to synchronize time. The method may also include combining the agent component of the vehicle with one or more agent components of the other vehicles in the coalition to form a distributed agent system. The method may also include controlling the coalition of vehicles with common commands from the distributed agent system in response to feedback from sensors in each of the vehicles. The method may further include and enabling an override of the coalition by the vehicle agent component in response to a breach of safety parameters.

According to a second aspect of the present disclosure there is provided a system for managing synchronized movement of a set of vehicles, wherein a vehicle has an agent component including a processor and a memory configured to provide computer program instructions to the processor to execute the function of the agent component. The agent component may include a negotiating component for, based on a set of parameters and goals for the vehicle, negotiating with one or more other vehicles to form a coalition of vehicles with a set of common parameter values and common goals, wherein a coalition aims to achieve the common goals whilst respecting the common parameters. The agent component may also include a synchronizing component for synchronizing with the other vehicles in the coalition to result in a positioning of the vehicle in relation to the other vehicles in the coalition and to synchronize time. The agent component may also include a combining component for combining the agent component of the vehicle with one or more agent components of the other vehicles in the coalition to form a distributed agent system and for controlling the coalition of vehicles with common commands from the distributed agent system in response to feedback from sensors in each of the vehicles. The agent component may also include a safety unit instructing component for enabling an override of the coalition by the vehicle agent component in response to a breach of safety parameters.

According to a third aspect of the present disclosure there is provided a computer program product for managing synchronized movement of a set of vehicles, the computer program product includes a computer readable storage medium having program instructions embodied therewith. The program instructions are executable by a processor to cause the processor to perform operations including, based on a set of parameters and goals for the vehicle, negotiating with one or more other vehicles to form a coalition of vehicles with a set of common parameter values and common goals, wherein a coalition aims to achieve the common goals whilst respecting the common parameters. Instructions may be included for synchronizing with the other vehicles in the coalition to result in a positioning of the vehicle in relation to the other vehicles in the coalition and to synchronize time. Instructions may also be included for combining the agent component of the vehicle with one or more agent components of the other vehicles in the coalition to form a distributed agent system; controlling the coalition of vehicles with common commands from the distributed agent system in response to feedback from sensors in each of the vehicles. Instructions may further be included for enabling an override of the coalition by the vehicle agent component in response to a breach of safety parameters.

BRIEF DESCRIPTION OF THE DRAWINGS

Example embodiments of the present disclosure will now be described, by way of example only, with reference to the following drawings in which:

FIG. 1 is a schematic diagram illustrating a set of vehicles in accordance with the present disclosure, in an example embodiment;

FIG. 6 is a schematic diagram illustrating an aspect of the present disclosure with the set of vehicles of FIG. 1, according to an example embodiment;

FIG. 7 is a block diagram showing a vehicle with components for use when independent and when in a coalition in accordance with an example embodiment of the present disclosure;

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the present disclosure, a set of vehicles may use a negotiation mechanism to form a coalition that acts as a single entity to perform a common goal. The movement of the coalition may be computed in a distributed way and, after a consensus is made, the decision may be enforced across all members, so that all vehicles forming the coalition move together as one. By moving as one, this may reduce the time that it takes vehicles to move in slow stop/start traffic.

Often there may be a delay between a vehicle moving and the vehicle behind reacting to this and moving themselves. This may be true whether the vehicle is controlled by a person or an automated system. Automated systems may remove the human response time; however, they may not remove the detection time of detecting movement of a vehicle in front.

The described technology may be capable of allowing in all vehicles in the coalition moving together, at a defined time. There may not be a delay between the first and last vehicle moving. This may reduce the time it takes for vehicles to move in traffic.

Referring to FIG. 1, a set of multiple vehicles 110 is illustrated by four vehicles A 111, B 112, C 113 and D 114. The set of vehicles 110 may use a negotiation mechanism to form a coalition 120 that may result in the vehicles being synchronized and acting as a single entity to perform a common goal. The movement of the coalition 120 may be computed in a distributed way by the resources of the vehicles 111-114 and, after a consensus is made, the decision may be enforced across all the vehicles 111-114, so that they move together as one.

Each vehicle 111-114 may include sensors located in it to detect movement, distance and objects and a control unit for controlling the vehicle 111-114. The combined sensors and control units of the vehicles 111-114 may decide how far the coalition 120 can move, and when obstacles are detected in the coalition's path as will be described in further detail below. The vehicles 111-114 may be autonomous entities capable of communicating and negotiating with others, as defined in standard multi-agent systems literature.

Figure 2:
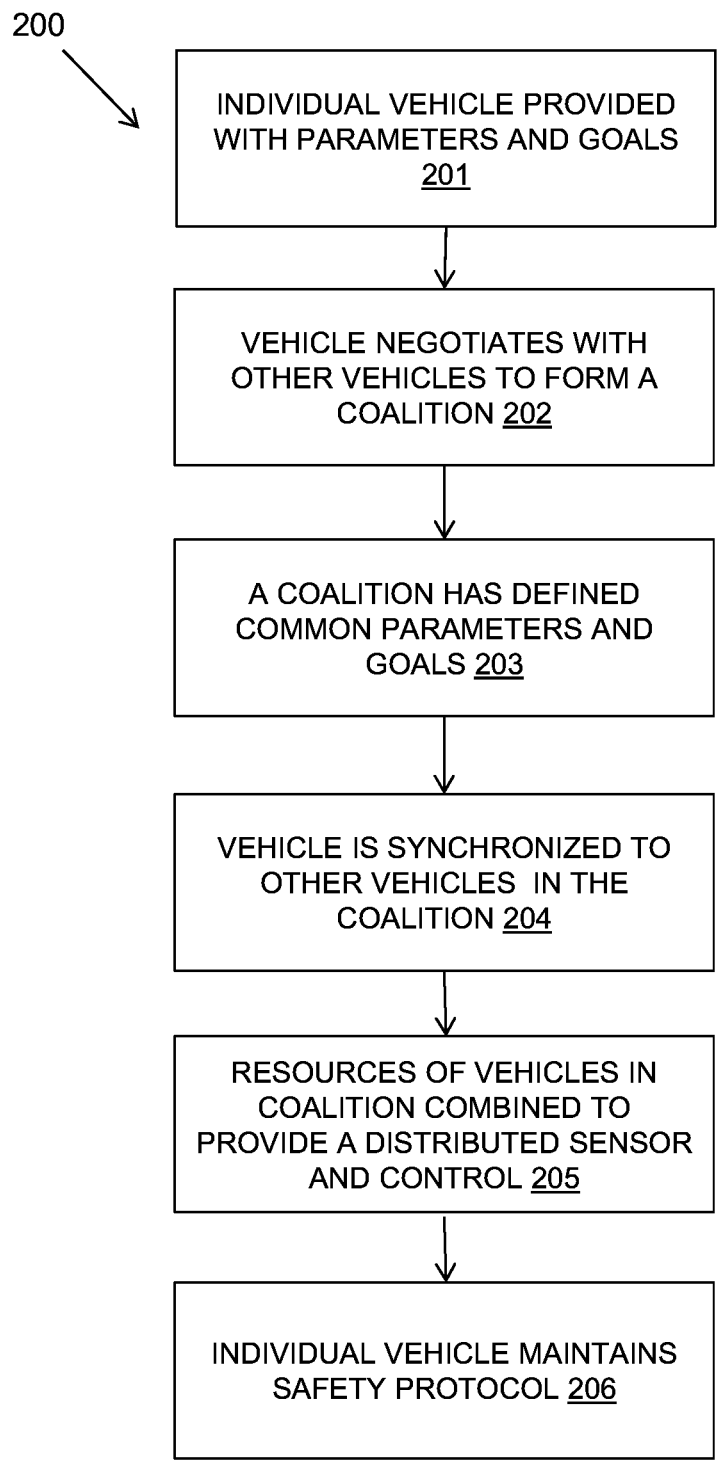
FIG. 2 is a flow diagram of an example embodiment of an aspect of a method in accordance with the present disclosure.

Referring to FIG. 2, a flow diagram 200 shows an example embodiment of an aspect of the described method of forming a stable coalition of vehicles and negotiating its goals and parameters from the perspective of an individual vehicle.

A vehicle may be 201 an autonomous entity with its own parameters and goals. Parameters may include, for example, breaking distance, minimum safety distance, the time needed to accelerate, etc. Goals may include, for example, to move with as little braking as possible, to start moving only when the gap in front is at least, for example, 20 meters, a direction of travel and/or destination to reach, and similar goals.

Based on the set of parameters and goals for the vehicle, a vehicle may negotiate 202 with the other vehicles to form a coalition of vehicles with a set of common parameter values and goals.

In a defined stationary traffic jam, all vehicles may enter into negotiation about forming a coalition with a common goal to move forward. Whether, how large, and how many coalitions may be formed may depend on individual vehicles and their goals and parameters.

Each vehicle may have its own benefit function that tells the vehicle how beneficial or advantageous it is to form a coalition. In some implementations, a vehicle may join a coalition only when there is no other coalition that is more beneficial to the vehicle. However, other conditions may also be considered. As the vehicle can also form a coalition with itself (or in other words not to form a coalition at all), it implies that it may be more beneficial for each vehicle to be in a coalition, than to be on its own. If there is no other coalition that the vehicle could join which would be more beneficial to the vehicle, it may not have an incentive to leave the coalition. A coalition where none of the vehicles has incentive to leave may be considered stable. Therefore, all formed coalitions may be stable. As part of forming a coalition, goals and parameters of the coalition may be negotiated 202. Each vehicle may or may not consider these parameters when deciding whether to join the coalition.

Vehicles may be candidates to join a coalition if they are within a predetermined range of other candidate vehicles. Constraints on a coalition such as a maximum number of vehicles in a coalition, a distance between vehicles, etc. may be configured and included in the negotiations.

A stable coalition 203 may have a set of common goals and parameters. This coalition of vehicles may be an autonomous entity of its own, capable of achieving its goals. The coalition may act in order to achieve its goals while respecting its parameters.

The vehicle may be synchronized 204 in formation and in time with other vehicles in the coalition.

For the duration of the coalition, all of its members may lose their autonomy and use the resources of the combined vehicles to provide 205 a distributed control and sensor system. However, Individual vehicles maintain 206 their safety protocols and an individual vehicle may leave the coalition at any time it considers convenient or necessary.

The vehicles in the coalition may provide resources that the coalition uses to achieve its goals. The coalition makes use of all its resources to reach decisions by using the sensors of all vehicles, and their computational power together with the agreed set of goals and parameters. Internally, the coalition may be seen as a distributed system.

Figure 3:
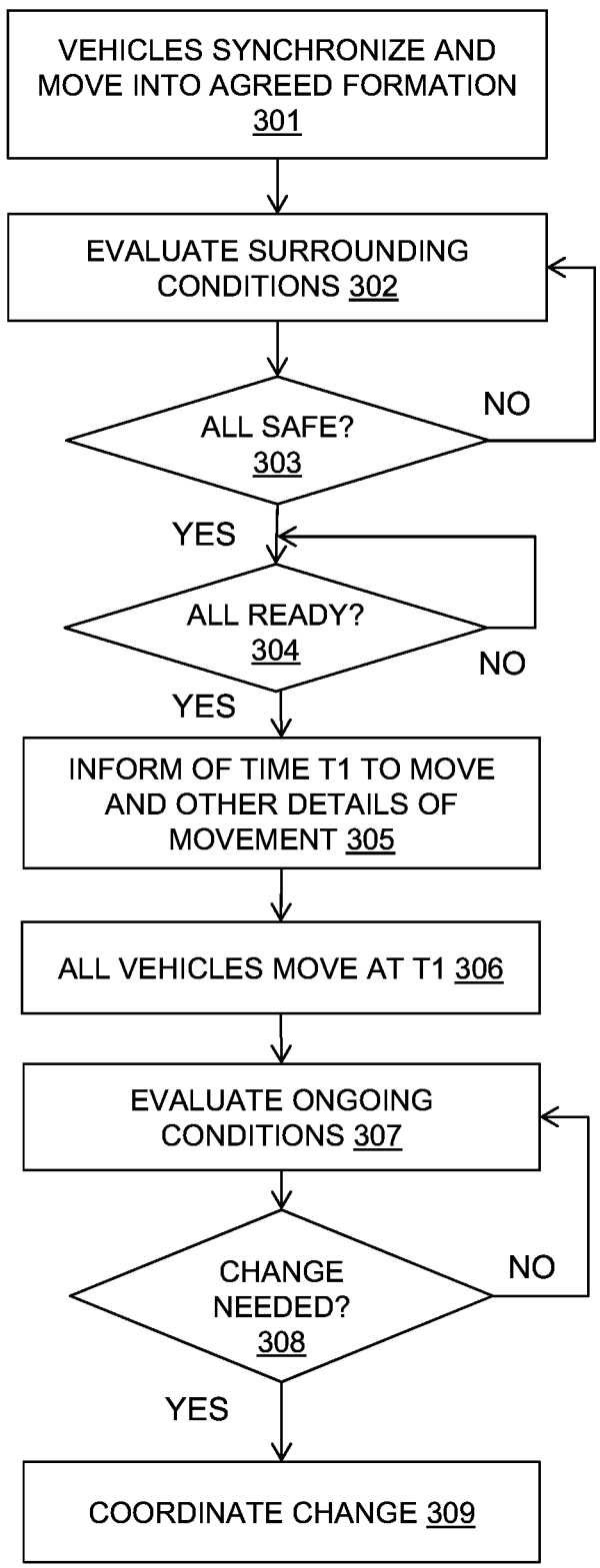
FIG. 3 is a flow diagram of an example of a further aspect of a method in accordance with an example embodiment of the present disclosure.

Referring to FIG. 3, a flow diagram 300 shows an example embodiment of an aspect of the described method of controlling the vehicles in the formed coalition as one autonomous virtual vehicle. The method may be carried out by the coalition by using resources of the individual vehicles as a distributed sensor and control system. This is referred to as the coalition system.

The vehicles in a coalition may be synchronized 301 in formation and time. The vehicles synchronize their time, which may later be used by the coalition to ensure all vehicles move at exactly the same time. The vehicles in a coalition may move into a formation. This may have been agreed during the coalition negotiation and may generally involve at least adjusting the empty space between the individual vehicles to an agreed distance to allow smooth movement. This agreed distance is not necessarily the same for all the individual vehicles and it may be a global one for the whole coalition (subject to parameters and negotiations), which must be at least the largest minimum safety distance of all vehicles plus some extra space for movement. Allowing extra space may be important in preventing the safety protocols of individual vehicles, taking control during normal operations of the coalition. For example, this may happen when braking takes longer than expected or a vehicle has a delay at starting.

The coalition system may then evaluate 302 surrounding conditions to detect whether it is possible to move. When it detects using the sensors of individual vehicles that the gap in front is at least the agreed distance, the coalition system may start a preparation procedure for the synchronized movement.

The coalition system may determine 303 using all the sensors that it is safe to move and there are no obstacles or dangers that would prevent the coalition from moving. This may not only include any obstacles and dangers at the front, but also by the side, or inside the coalition. If any obstacle or danger is detected, the preparation procedure may be terminated and the method may loop to evaluate the surrounding conditions 302.

The coalition system may check 304 that all vehicles are ready to move. If, for example, it detects that one vehicle has a malfunction, the preparation procedure may be terminated and the method loops to evaluate when all the vehicles are ready to move.

The coalition system may inform 305 all vehicles the time $T1=T+\alpha$, when the coalition will move forwards, where 'T' is the current time, and 'a' is the agreed delay. The delay may ensure that all vehicles have enough time to prepare for movement (e.g. vehicles with start-stop systems may need longer time to prepare for the movement), and it may solve the problem of a communication lag that would cause each vehicle to move at a slightly different time. Since the time of all vehicles may be synchronized and they all have information about when to move beforehand, they can move at exactly the same time. This may put several restrictions on the delay, as it has to be larger than the communication lag together with the maximum time needed to prepare for movement.

Together with the time T1, other details about the movement such as acceleration speed, the desired movement speed, and similar are passed to all the vehicles. Optionally, if known, the movement distance is disclosed as well. All of the parameters are calculated based on the agreed goals and parameters in combination with the current circumstances.

Figure 4:
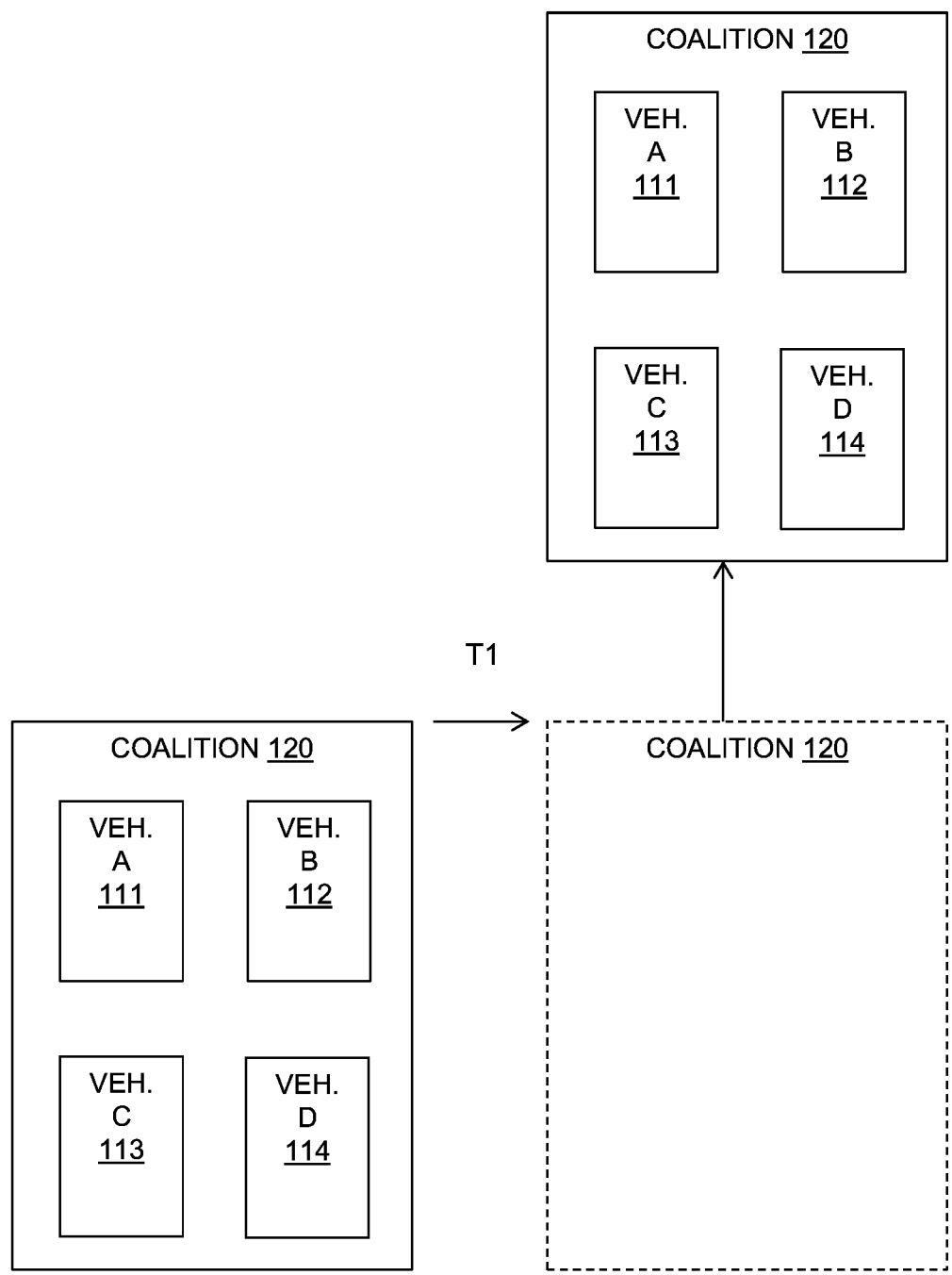
FIG. 4 is a schematic diagram illustrating an aspect of the present disclosure with the set of vehicles of FIG. 1, according to an example embodiment.

At exactly time T1, the coalition (i.e. all vehicles in the coalition) start moving 306 forward. This is illustrated in FIG. 4, which shows the coalition 120 of FIG. 1 of four vehicles 111-114 moving at time T1.

The coalition may then evaluate 307 ongoing conditions and surroundings and decide whether any changes are necessary. These are, as examples but not limited to, the changes of the movement speed (including stopping), changes of a direction, or invalidating the movement distance that was decided before the movement began. If a change is necessary, the coalition may start the preparation procedure for coordinating 309 the change.

The changing movement parameters may be as follows. The coalition informs all vehicles about the time $T2=+\alpha$, when the change will take effect, where 'T' is the current time, and 'α' is the agreed delay. Together with the time T2 details about the changes to the movement may be passed to all vehicles.

At exactly time T2, the coalition (i.e. all vehicles in the coalition) may exercise the changes to the movement. If the movement distance was specified, and it was not invalidated, the coalition may stop after moving the agreed distance. Note that it may not be possible to change (or specify) the movement distance once the movement has started as there may be no clear reference point that may be used due to the communication lag and the vehicles being on the move. Instead, if the coalition wishes to move further, it may invalidate the distance, and then change the movement speed to zero when desired. If the coalition wishes to stop earlier, it is not necessary to invalidate the movement distance first. Any change to the speed is not immediate, but similarly as when the movement begins, it includes information about acceleration/deceleration that are calculated based on the agreed goals and parameters together with the current circumstances.

As mentioned earlier, any vehicles may choose to leave the coalition at any time following the correct procedure.

The vehicle wishing to leave the coalition may inform all other vehicles of the time $T3=T+\alpha$, when the change will take effect, where 'T' is the current time, and 'α' is the agreed delay.

At exactly time T3, the coalition may cease to exist, and all vehicles may regain their autonomy. Following the breaking of the coalition, each vehicle may choose to continue on its own, or join another coalition. A vehicle may choose to leave the coalition for any reason. Example reasons include, but are not limited to: it is no longer beneficial to be part of the coalition, the destination of the vehicle changes and it needs to take a different road, or the vehicle is signaled by a police patrol to pull over.

Scenarios where something goes wrong are now considered. There may be two general different types of problems: non-critical problems to the functionality of the coalition, and critical problems.

Non-critical problems may be defined as situations where the coalition can resolve the problem through normal operations. On the other hand, critical problems may be defined as situations where the coalition cannot function any more and results in the coalition breaking up.

An example of a non-critical problem includes an obstacle becoming known to the coalition. Another example would be an entity having a mechanical failure. The resolution to these problems may be dealt with through designed functionality.

Figure 5:
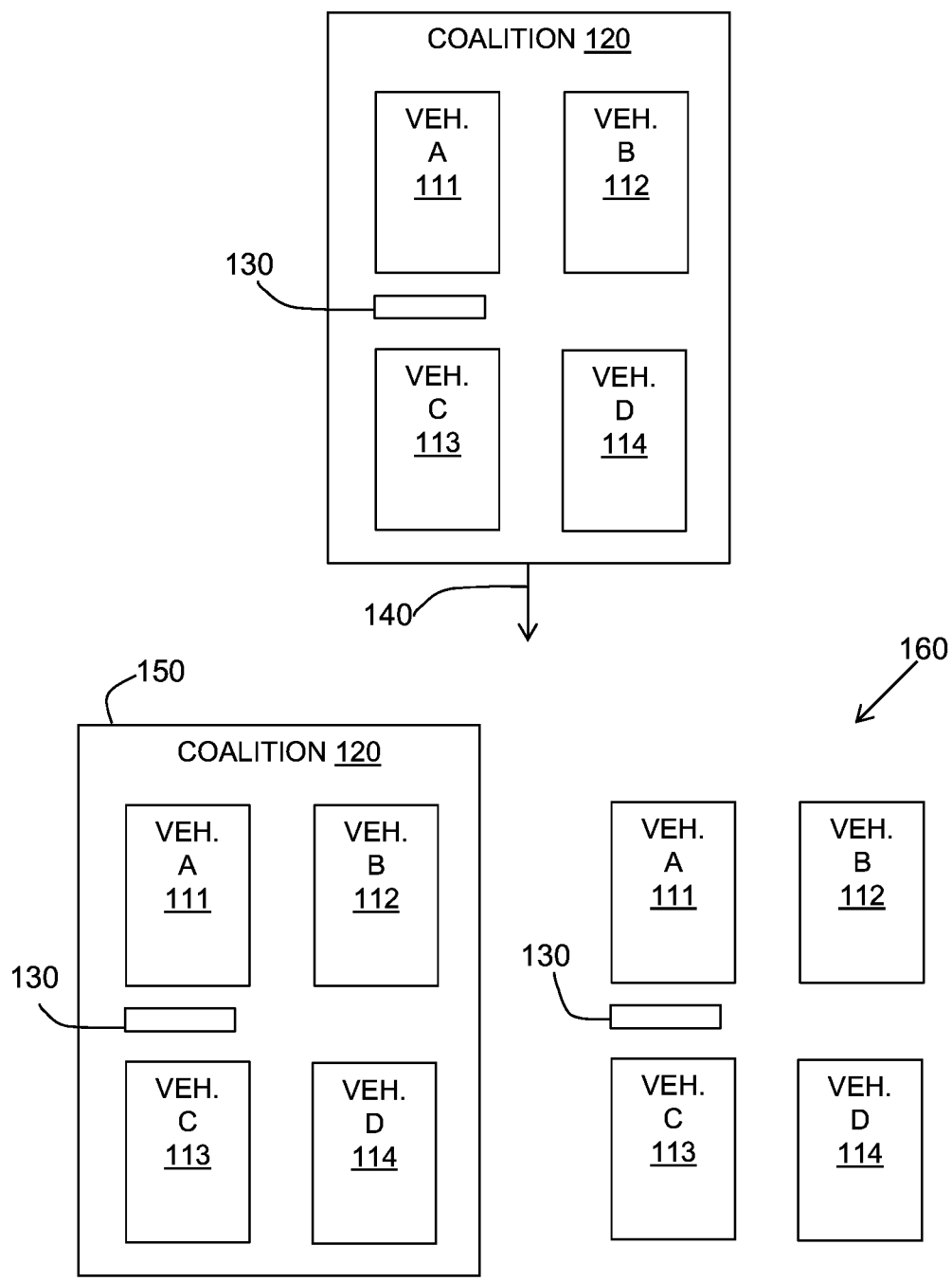
FIG. 5 is a schematic diagram illustrating an aspect of the present disclosure with the set of vehicles of FIG. 1, according to an example embodiment.

Referring to FIG. 5 an example of a non-critical problem scenario is illustrated in which a coalition is moving 140 when an obstacle 130 is sensed, such as a pedestrian trying to walk between the vehicles in the coalition 120. The coalition 120 evaluates the situation and an appropriate action is chosen based on the agreed goals and parameters. This action may be, but is not limited to, one of the following:

1. The coalition decides to stop 150.
2. The coalition decides to break 160, leaving the individual vehicles 111-114 to handle the situation on their own.

Each of these actions may be applied in a similar manner to when changing the movement parameters. In some embodiments the action is chosen solely based on the goals and parameters of the coalition that were agreed when forming the coalition. Regardless of the chosen action, each vehicle may choose to leave the coalition if it deems it appropriate or necessary (e.g. the coalition decides to stop, but a vehicle that can move prefers to do so).

A special case of the above-described functionality to deal with non-critical problems may occur when a coalition decides to split into two sub-coalitions with the set of goals and parameters inherited from the original coalition. This is a valid action to take as each vehicle can then immediately choose to leave the newly created coalition if it desires. Splitting into two sub-coalitions may be the equivalent to breaking up and then, based on negotiations, forming two new coalitions. The advantage of the former approach may include reduced communication overhead that allows two new coalitions to start functioning immediately rather than going through the whole process of forming a coalition again. A situation when this might be a preferred solution is, for example, when the coalition is passing through traffic lights and the signals change to red halfway through. In that case, the coalition can only break, and the individual vehicles would most likely immediately form two new coalitions any way. Whether the coalition should break, or just split into two or more sub-coalitions, in these types of situations may be negotiated when forming the coalition.

Examples of critical problems may include, but are not limited to: where one of the vehicles stops communicating, any protocol of the coalition is broken, or the minimum safety distance is breached. In this instance, the coalition cannot continue to function and breaks. A detailed example is when one of the vehicles stops communicating and slows down and the minimum safety distance is then breached by the vehicle behind.

This differs from a non-critical problem, because the coalition can no longer function. The vehicle that has stopped communicating cannot be informed of any decision that has been made. At this point, the coalition breaks. This is illustrated in FIG. 6 showing the coalition 120 losing communication with vehicle A 111. The coalition breaks 170.

Referring to FIG. 7, a block diagram shows the components that may be provided in a vehicle 111 and how these may provide different functionality when the vehicle 111 joins a coalition 120.

Each vehicle may contain a control and sensor unit (CASU) 710. The CASU 710 may be responsible for executing all low-level operations such as steering, accelerating, braking. It may also be responsible for reading the data of various sensors 701-703 that the vehicle 111 is equipped with and making them available for consumption. The CASU 710 may be a virtual equivalent of a steering wheel, pedals, speed meter, and similar. Similarly like its physical equivalents, the CASU 710 may not make any decisions; it merely executes instructions it has been given.

Each vehicle 111 may also be equipped with a safety unit (SU) 720. The SU's 720 responsibility is that the safety of the vehicle 111 is not compromised. The vehicle safety can, for example, consist of a minimum safety distance and the maximum speed while going through bends. The exact definition of the vehicle safety may differ from vehicle to vehicle. The SU 720 may have a direct access to the CASU 710, and it may constantly monitor all inputs to detect a breach of the safety protocols. If it detects that the safety of the vehicle 111 has been compromised, it may immediately instruct the CASU 710 to apply correcting steps (e.g. reducing speed or braking if a safety distance has been compromised); overriding any previous instructions the CASU 710 might have received. In addition, the SU 720 may block all external commands to the CASU 710 (i.e. the ones that do not come from the SU 720 itself) that will compromise the safety of the vehicle (e.g. accelerating while there is an obstacle ahead).

Finally, each vehicle may include an autonomous agent component 730 that, given the goals and preferences entered by the user together with the vehicle parameters, may control the vehicle by issuing commands to the CASU 710 based on the sensors' inputs from the CASU 710. The agent component 730 may be a virtual equivalent of a human driver. In order for the agent component 730 to control the vehicle, it needs to perform various tasks such as to project the vehicle surrounding and detect if there is any obstacle, predict movement of surrounding vehicles, compute the vehicle trajectory, and/or compute the vehicle acceleration. Some of these tasks may be performed in parallel while others depend on each other. In addition, each agent component 730 may be capable of communicating and negotiating with other autonomous vehicles. The frequency in which the agent component 730 issues commands to the CASU 710 depends on the complexity of the environment. This is no different from a human driver. If the environment is complex and constantly changing, then the driver needs to adjust the speed and trajectory more often to react to unforeseen circumstances.

Each vehicle 111 may also include a communication device 740 capable of sending and receiving messages to other vehicles. Any appropriate vehicle-to-vehicle communication technology, network, protocols and security may be used. Each vehicle 111 may have its own private key that may be used to sign its messages and corresponding public key to be provided to other vehicles to ensure that the authenticity of messages can be verified.

For each vehicle 111 in a coalition 120, the CASU 710 and the SU 720 stay intact and unaffected by the fact that the vehicle 111 is now part of the coalition 120. The responsibilities of each agent component 730 may reduce to only one—leaving the coalition if it deems desirable. For the duration of the coalition, the agent component 730 loses the control of the vehicle 111 in favor of the coalition 120 that becomes responsible for controlling the vehicle 111. To contrast the situation with human-driven vehicles, the agent component 730 may now a virtual equivalent of a passenger in a taxi. Although the agent component 730 is not in control of the vehicle anymore, the safety of the vehicle has not changed as all safety protocols remain unaffected. Effectively, the driver has changed which might result in a different driving strategy, but cannot change the characteristics of the vehicle.

The coalition 120 may be an autonomous agent on its own that controls all constituting vehicles 111 as one. Internally, the coalition 120 may be formed of multiple sub-agent components 731, one per vehicle 111 that is part of the coalition 120, that work together on solving the common goal of controlling the coalition 120. Each sub-agent component 731 may be responsible for a subset of tasks that are required to control the coalition 120. These tasks consist of the same tasks that are required to control a single vehicle (e.g. project surrounding of the coalition and detect if there are any obstacles, predict the movement of surrounding vehicles, compute the coalition trajectory, or compute the coalition acceleration) plus some additional ones in order to deal with the distributive nature of the coalition 120 (e.g. making sensor inputs available to the coalition, translating coalition control commands into internal vehicle control commands). To distinguish this from the single vehicle case, the tasks performed by each sub-agent component 731 are referred to as roles. Furthermore, for simplicity, in the following description each sub-agent component 731 is referred to simply as a vehicle. Following the new terminology, each vehicle (sub-agent component 731) in the coalition 120 has an assigned set of roles.

Starting with the mandatory roles, each vehicle 111 may be able to send its sensor 701-703 inputs to other vehicles 112-114 in the coalition 120, and to execute commands issued by the coalition. In addition, each vehicle 111-114 may be assigned some additional roles, depending on its position within the coalition 120, number of vehicles in the coalition, and similar. It is possible that some of the vehicles 111-114 may not be assigned any additional roles.

Figure 8:
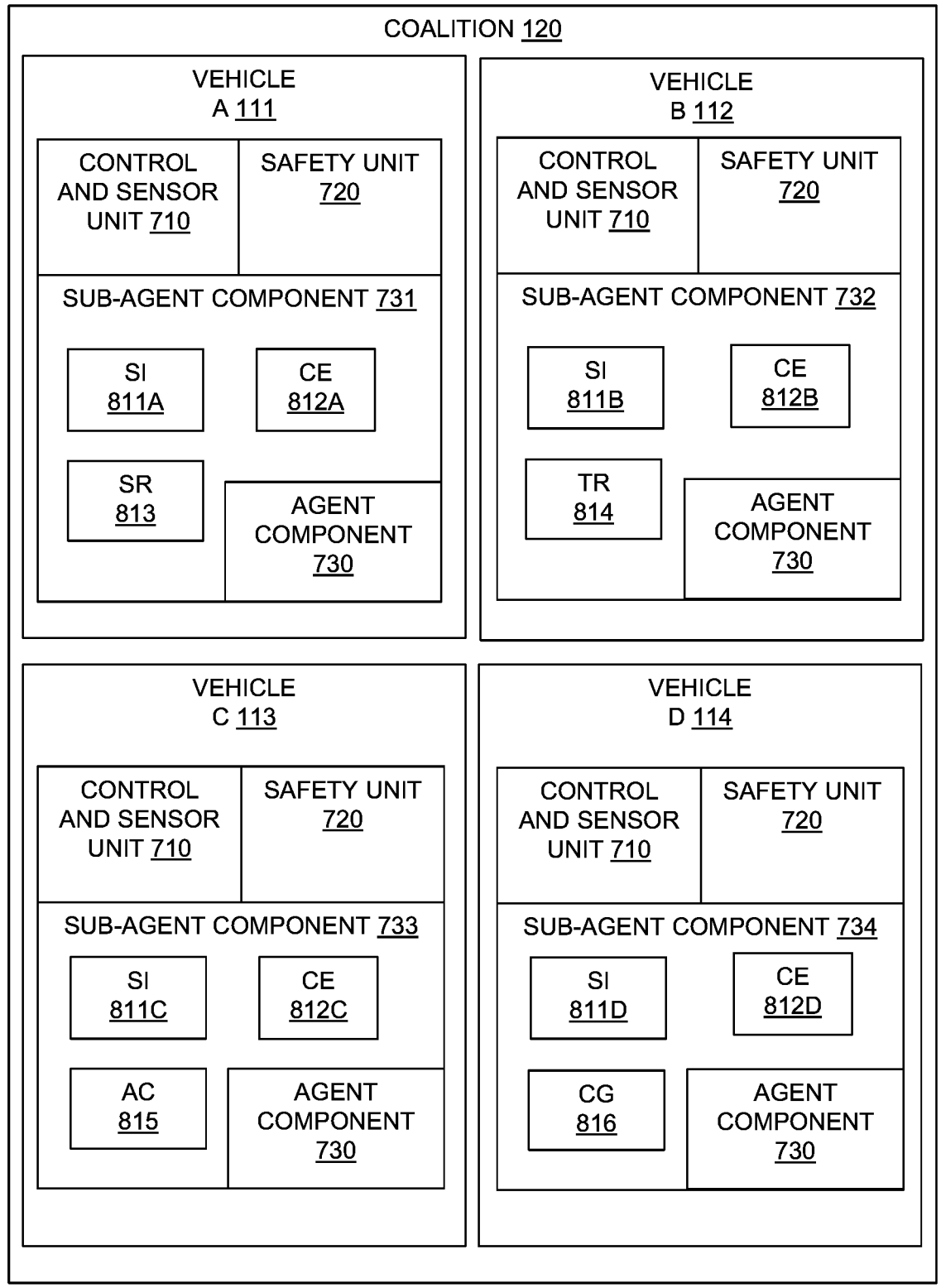
FIG. 8 is a block diagram showing a coalition of vehicles in accordance with an example embodiment of the present disclosure.

To demonstrate this with an example, reference is made to FIG. 8, which shows a coalition 120 of four vehicles A 111, B 112, C 113, and D 114. The roles may be as follows and may be provided by component functionality in the vehicle's sub-agent component 731.

Sensor Inputs component 811 (SI): Collecting sensor inputs for the coalition.

Commands Execution component 812 (CE): Executing commands issued by the coalition.

Surrounding component 813 (SR): Projecting the surrounding of the coalition based on sensor inputs from all vehicles, and predicting movement of surrounding vehicles.

Trajectory component 814 (TR): Computing a trajectory for the coalition as a whole, and deriving trajectories of individual vehicles from that.

Acceleration component 815 (AC): Computing acceleration for the coalition as a whole, and deriving acceleration of individual vehicles from that.

Commands Generation component 816 (CG): Generating commands for each vehicle containing their trajectory and acceleration.

The vehicles 111-114 in this example may be assigned the following roles:
Vehicle A 111: SI 811A, CE 812A, SR 813.
Vehicle B 112: SI 811B, CE 812B, TR 814.
Vehicle C 113: SI 811C, CE 812C, AC 815.
Vehicle D 114: SI 811D, CE 812D: CG 816.

Figure 9:
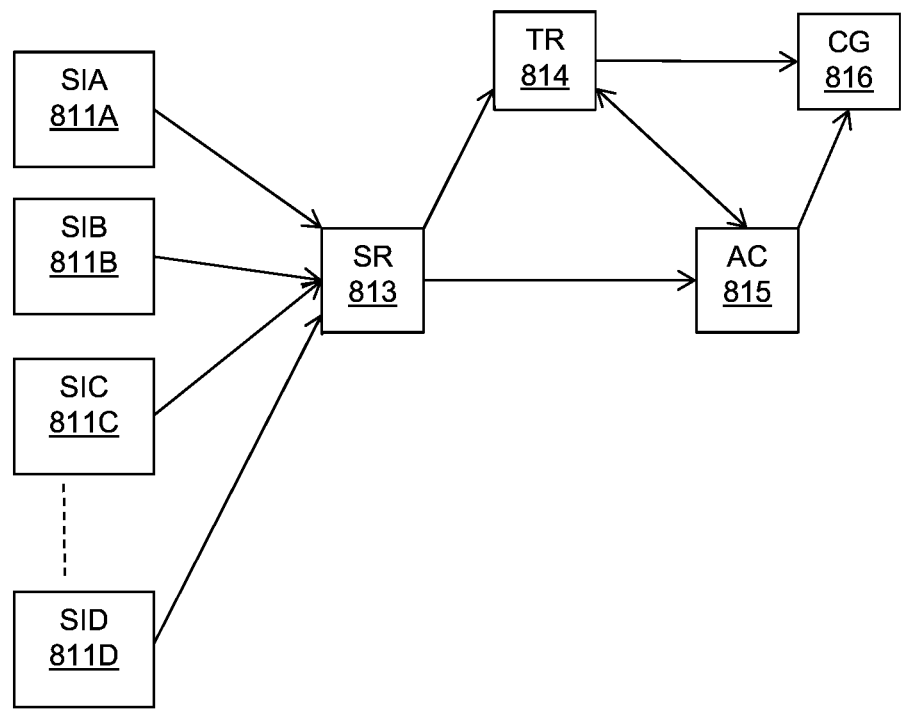
FIG. 9 is a schematic diagram showing dependencies of roles of vehicles in accordance with an aspect of an example embodiment of the present disclosure.

Similar to tasks, individual roles depend on each other. In the example, dependencies are as shown in FIG. 9:
SR 813 depends on SI 811A-811D from all vehicles 111-114.
TR 814 depends on SR 813 and AC 815.
AC 815 depends on SR 813 and TR 814.
CG 816 depends on TR 814 and AC 815.

It should be noted that there may be circular dependencies; for example, TR 814 depends on AC 815 and vice versa. This is no different from the single vehicle case, where the circular dependency exists as well. There are multiple options of how to resolve a circular dependency but, to name one, first a trajectory is computed based on the last known value for acceleration, and then the newly computed trajectory is used to update the acceleration.

Figure 10:
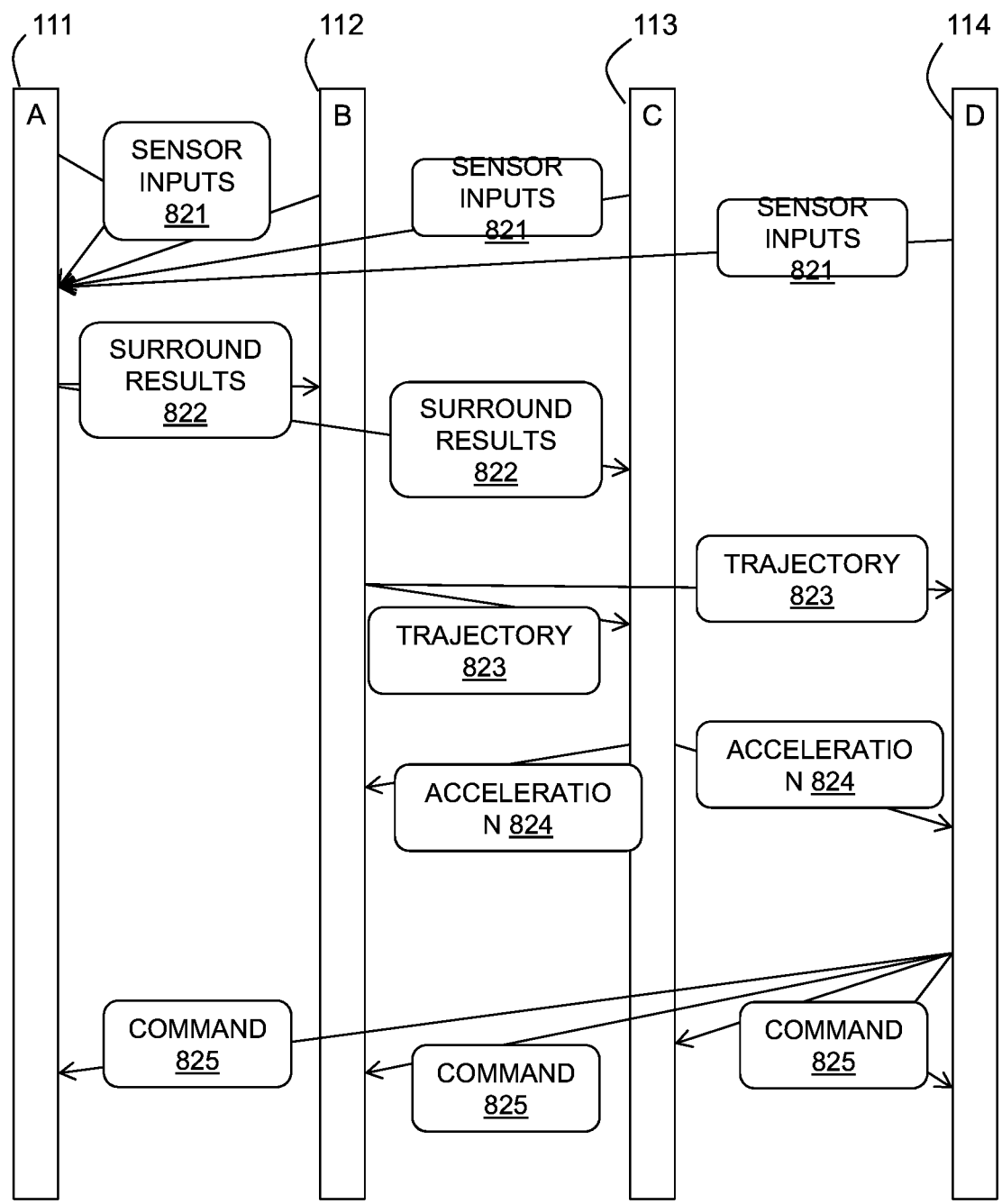
FIG. 10 is a schematic diagram showing communication between vehicles in accordance with an aspect of an example embodiment of the present disclosure.

The whole coalition 120 may then work as a pipeline shown in FIG. 10 in which each vehicle A 111, B 112, C 113, D 114 is shown.

All vehicles 111-114 send sensor inputs 821 to vehicle A's surround component 813 (SR).

Vehicle A's 111 surround component 813 (SR) computes the surrounding of the coalition, and sends the surrounding result 822 to vehicle B's 112 trajectory component 814 (TR) and vehicle C's 113 acceleration component 815 (AC).

Vehicle B's 112 trajectory component 814 (TR) uses the last known acceleration to compute the trajectory of the coalition, and sends the trajectory 823 to vehicle C's 113 acceleration component 815 (AC) and vehicle D's 114 commands generation component 816 (CG).

Vehicle C's 113 acceleration component 815 (AC) computes the acceleration of the coalition, and sends the acceleration 824 to vehicle B's 112 trajectory component 814 (TR) and vehicle D's 114 commands generation component 816 (CG).

The commands generation component 816 (CG) of vehicle D 114 generates and sends commands 825 to all vehicles 111-114.

The above described model works well if everything works as expected. It is, however, when something goes wrong where fast reaction may be necessary, and going through the whole pipeline might be just too slow. For this reason, each vehicle may be capable of issuing emergency commands in case some protocols are breached. These commands may have priority over standard commands issued by commands component 816. For example, if surrounding component 813 detects there is an obstacle ahead, it will send a command to all vehicles to stop immediately instead of just forwarding the information. This ensures prompt response to unforeseen circumstances.

Further details are provided of an example communication method for communication between vehicles when negotiating and when in a coalition.

Each vehicle may be equipped with a device capable of sending and receiving messages to other vehicles. Each vehicle may have its own private key that it can use to sign its messages, and corresponding public key.

When forming a coalition, all vehicles may exchange their public keys so that authenticity of messages can be verified. Roles may be assigned to all vehicles; each vehicle builds a routing table. The retry interval, number of retries, and the maximum interval between updates may be agreed on.

During the existence of the coalition, each role may send updates to roles that depend on it. For the purposes of an example, it is assumed that vehicle A is calculating a trajectory, and vehicle B is calculating acceleration:

Senders actions:
Vehicle A calculates a trajectory.
Vehicle A finds out from its routing table that Vehicle B depends on it.
Vehicle A signs a message containing the calculated trajectory with its private key.
Vehicle A sends the signed message to Vehicle B, and waits for a confirmation from Vehicle B.
If it receives the confirmation, the protocol ends. A new trajectory will be calculated sometime in the future, but no later than the agreed maximum update interval.
If it does not receive the confirmation within the retry interval, and the maximum number of retries has not been exceeded, then it re-sends the message.

Receiver actions:
Vehicle B waits for a trajectory.
If it receives a message, it will:
Verify the message authenticity. If the message signature does not match, then the situation is resolved as a critical problem (the communication from the coalition cannot be trusted anymore).
Determine the type of the message, and checks in its routing table that the sender is authorized to send this type of message (e.g. only vehicle A can send trajectory updates). If not, then the situation is resolved as a critical problem (the communication from the coalition cannot be trusted anymore).
Confirms it received the message.
If it does not receive the message within the agreed maximum update interval, then the situation is resolved as a critical problem (vehicle A stopped communicating).

In summary, a coalition of vehicles may be formed, through negotiation, which then moves as a single entity, removing the ripple effect seen in current traffic patterns. A robust mechanism resolves any problems that might occur during the duration of the coalition. The functionality may be included in vehicle software.

The coalition may not use or rely on a lead vehicle. Existing solutions use a lead vehicle that controls a platoon of vehicles. In the described method and system, vehicles may be equal and form one virtual vehicle (the coalition). The coalition may have a full control over the platoon, and it combines inputs and computational resources of all its constituting vehicles. This means that more complex and possibly more efficient driving strategies can be explored.

A coalition may be treated as a vehicle with its own parameters and set of goals as opposed to existing solutions that may treat a linked group of vehicles just as a group of individual vehicles. These parameters and goals are agreed upon when the coalition is formed. A consequence of this approach is that the coalition may be part of another coalition. This allows use cases that otherwise would not be possible. A group of vehicles that are travelling together from place A to place B may form a coalition, and then dynamically join as a single entity another coalition for part of their journey. Since they are joining as a coalition, they are seen by other members of the coalition as one virtual vehicle, and cannot therefore be separated.

Figure 11:
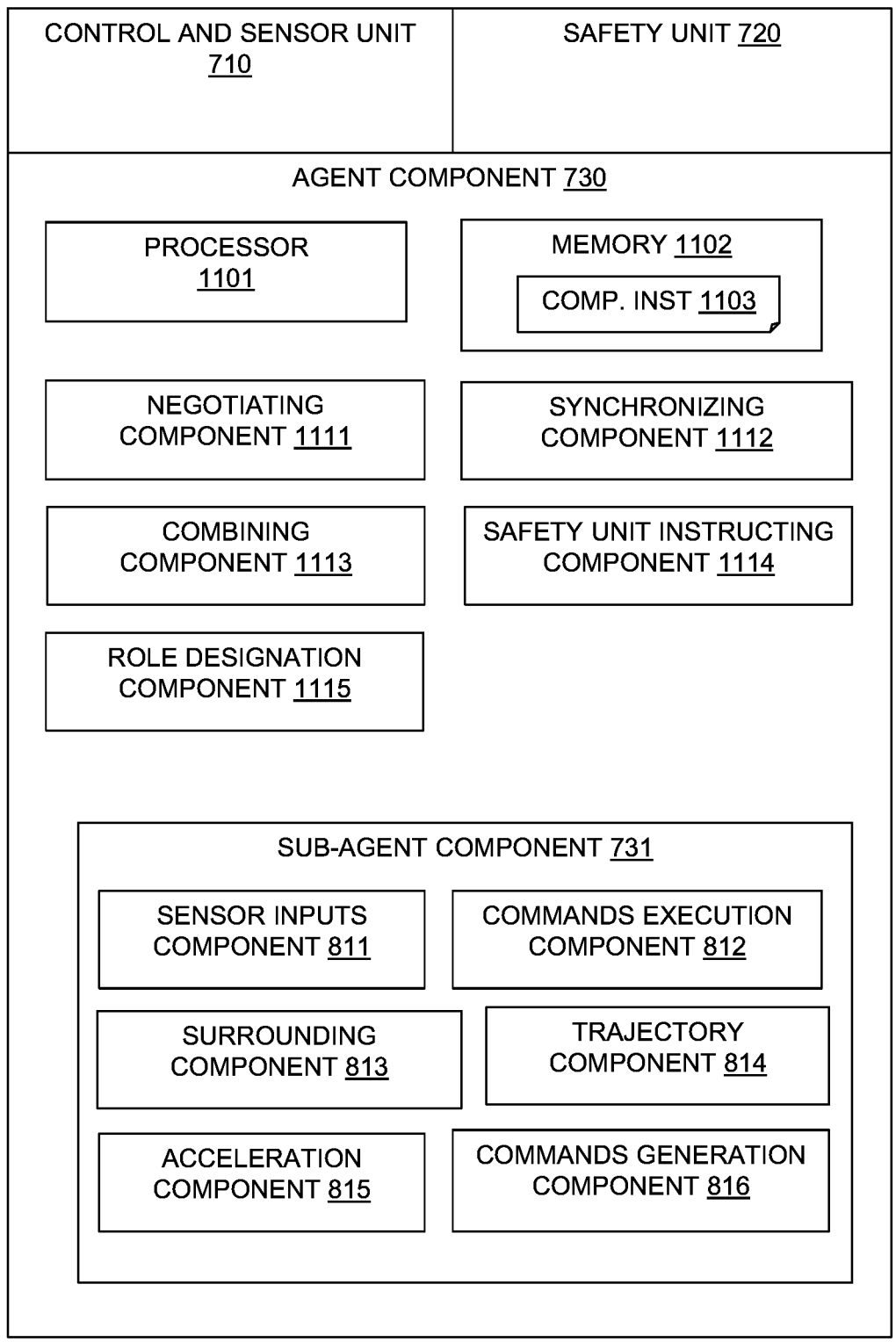
FIG. 11 is block diagram of an example embodiment of a system in accordance with the present disclosure.

Referring to FIG. 11, an example embodiment of an agent component 730 of a vehicle is shown with the functionality of a sub-agent component 731 which may be used when a coalition is formed. The agent component 730 may include at least one processor 1101, a hardware module, or a circuit for executing the functions of the described components which may be software units executing on the at least one processor. Multiple processors running parallel processing threads may be provided enabling parallel processing of some or all of the functions of the components. Memory 1102 may be configured to provide computer instructions 1103 to the at least one processor 1101 to carry out the functionality of the components.

The agent component 730 may include a negotiating component 1111 for, based on a set of parameters and goals for the vehicle, negotiating with one or more other vehicles to form a coalition of vehicles with a set of common parameter values and common goals. A coalition aims to achieve the common goals whilst respecting the common parameters;

The agent component 730 may include a synchronizing component 1112 for synchronizing with the other vehicles in the coalition to result in a positioning of the vehicle in relation to the other vehicles in the coalition and to synchronize time.

The agent component 730 may include a safety unit instructing component 1114 for enabling an override of the coalition by the vehicle agent component in response to a breach of safety parameters by communication with the safety unit 720.

The agent component 730 may include a combining component 1113 for combining the agent component of the vehicle as a sub-agent component 731 with the sub-agent components of the other vehicles in the coalition to form a distributed agent system. The distributed agent system controls the coalition of vehicles with common commands from the distributed agent system in response to feedback from sensors in each of the vehicles.

The agent component 730 may include a role designation component 1115 for receiving designation of one or more processing role of the distributed agent system and communicating with the other vehicle sub-agent components regarding the role.

The sub-agent component 731 may include a sensor inputs component 811 for sending sensor input from the vehicle agent component to all the other vehicles in the coalition and a commands execution component 812 for executing commands received from the distributed agent system. The commands are generated at one of the vehicle's sub-agent components. The commands execution component 812 for executing commands received from the distributed agent system instructs a control unit for controlling the vehicle's operation including steering, accelerating and braking.

The role designation component 1115 may designate the sub-agent component to provide one or more of: a surrounding component 813 for projecting a surrounding of the coalition of vehicles, a trajectory component 814 for computing a trajectory for the coalition of vehicles and individual vehicles, an acceleration component 815 for computing acceleration for the coalition of vehicles and individual vehicles, and a commands generation component 816 for generating commands for each vehicle including their trajectory and acceleration.

Figure 12:
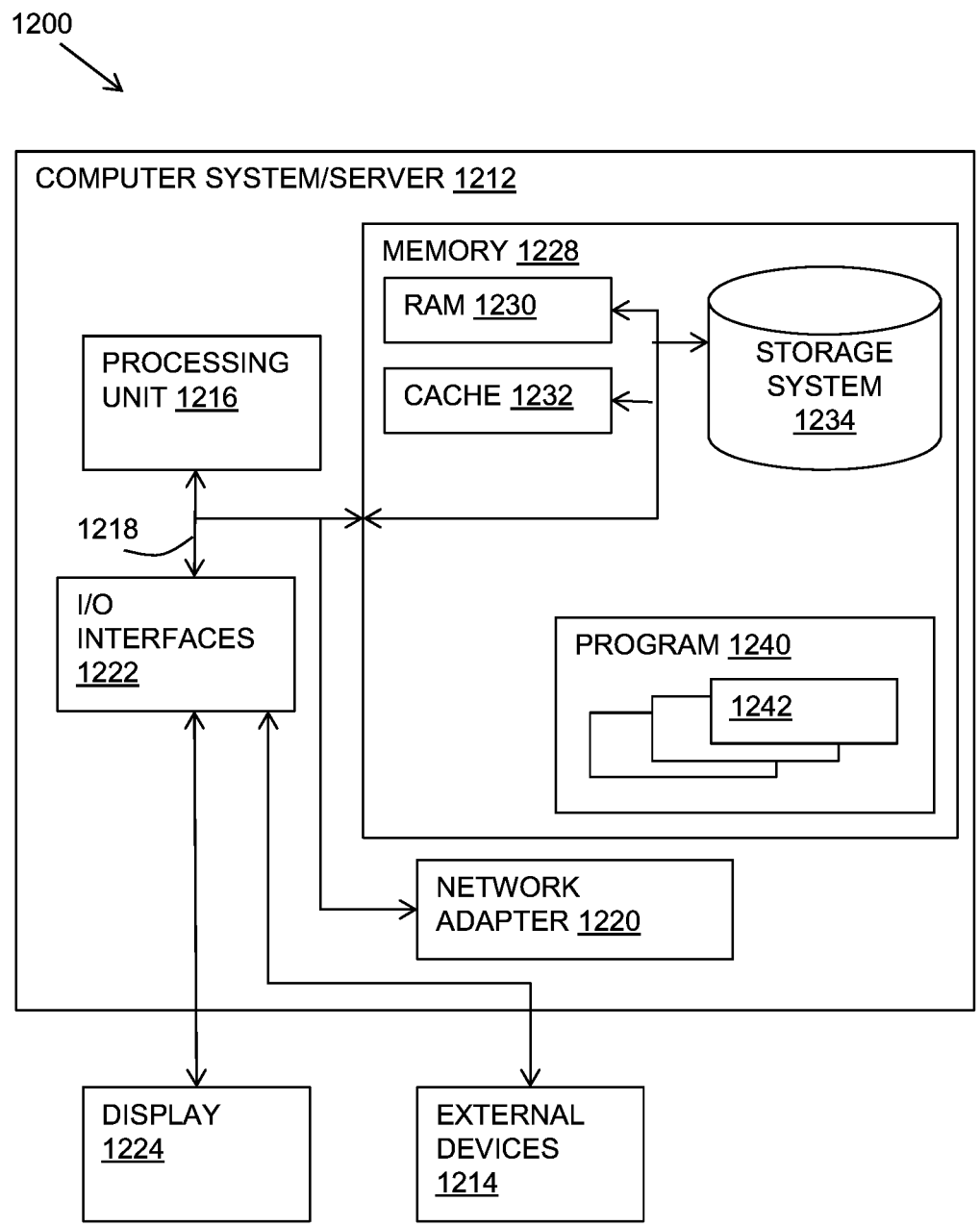
FIG. 12 is a block diagram of an example embodiment of a computer system in which the present disclosure may be implemented.

Referring now to FIG. 12, a schematic of an example of a system 1200 in the form of a vehicle computer system is shown in which the described vehicle units and components may be implemented.

A vehicle computer system 1212 may be operational with numerous other general purpose or special purpose computing system environments or configurations.

A vehicle computer system 1212 may be described in the general context of computer system-executable instructions, such as program modules, being executed by a computer system. Generally, program modules may include routines, programs, objects, components, logic, data structures, and so on that perform particular tasks or implement particular abstract data types. Vehicle computer systems 1212 may be practiced in distributed computing environments where tasks are performed by remote processing devices that are linked through a communications network. In a distributed computing environment, program modules may be located in both local and remote computer system storage media including memory storage devices.

In FIG. 12, a computer system 1212 is shown in the form of a general-purpose computing device. The components of the computer system 1212 may include, but are not limited to, one or more processors or processing units 1216, a system memory 1228, and a bus 1218 that couples various system components including system memory 1228 to processor 1216.

Bus 1218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 1212 typically includes a variety of computer system readable media. Such media may be any available media that is accessible by computer system/server 1212, and it includes both volatile and non-volatile media, removable and non-removable media.

System memory 1228 can include computer system readable media in the form of volatile memory, such as random access memory (RAM) 1230 and/or cache memory 1232. Computer system/server 1212 may further include other removable/non-removable, volatile/non-volatile computer system storage media. By way of example only, storage system 1234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1218 by one or more data media interfaces. As will be further depicted and described below, memory 1228 may include at least one program product having a set (e.g., at least one) of program modules that are configured to carry out the functions of embodiments of the invention.

Program/utility 1240, having a set (at least one) of program modules 1242, may be stored in memory 1228 by way of example, and not limitation, as well as an operating system, one or more application programs, other program modules, and program data. Each of the operating system, one or more application programs, other program modules, and program data or some combination thereof, may include an implementation of a networking environment. Program modules 1242 generally carry out the functions and/or methodologies of embodiments of the invention as described herein.

Computer system 1212 may also communicate with one or more external devices 1214 such as a keyboard, a pointing device, a display 1224, etc.; one or more devices that enable a user to interact with computer system 1212; and/or any devices (e.g., network card, modem, etc.) that enable computer system 1212 to communicate with one or more other computing devices. Such communication can occur via Input/Output (I/O) interfaces 1222. Still yet, computer system 1212 can communicate with one or more networks such as a local area network (LAN), a general wide area network (WAN), and/or a public network (e.g., the Internet) via network adapter 1220. As depicted, network adapter 1220 communicates with the other components of computer system 1212 via bus 1218. It should be understood that although not shown, other hardware and/or software components could be used in conjunction with computer system 1212. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A system including a processor and a memory configured to provide computer program instructions to the processor, the instruction comprising:

a negotiating component for, based on a set of parameters and goals for a vehicle having an agent component, negotiating with one or more other vehicles to form a coalition of vehicles with a set of common parameter values and common goals, wherein the coalition aims to achieve the common goals whilst respecting the common parameters;

a synchronizing component for synchronizing with the other vehicles in the coalition to result in a positioning of the vehicle in relation to the other vehicles in the coalition and to synchronize time;

a combining component for combining the agent component of the vehicle with one or more agent components of the other vehicles in the coalition to form a distributed agent system and for controlling the coalition of vehicles with common commands from the distributed agent system without using a single vehicle controlling the coalition, and in response to feedback from sensors in each of the vehicles, wherein the combining component for combining the agent component of the vehicle with the agent components of the other vehicles in the coalition to form a distributed agent system includes:

a role designation component for receiving designation of one or more processing roles of the distributed agent system and communicating with the other vehicle agent components regarding the role, the communicating with the other vehicle agent components regarding the role being authorized by a routing table indicative of dependency of the other vehicle agent components on the role; and a safety unit instructing component for enabling an override of the coalition by the vehicle agent component in response to a breach of safety parameters.

2. The system as claimed in claim 1, wherein controlling the coalition of vehicles with common commands from the distributed agent system in response to feedback from sensors in each of the vehicles includes:

a sensor inputs component for sending sensor input from the vehicle agent component to all the other vehicles in the coalition; and a commands execution component for executing commands received from the distributed agent system, wherein the commands are generated at one of the agent components of the vehicles.

3. The system as claimed in claim 2, wherein the commands execution component for executing commands received from the distributed agent system instructs a control unit for controlling the vehicle's operation including steering, accelerating and braking.

4. The system as claimed in claim 2, wherein controlling the coalition of vehicles with common commands from the distributed agent system in response to feedback from sensors in each of the vehicles includes:

the commands execution component receiving a common command including a start time for an action wherein the start time is the current time plus a delay.

5. The system as claimed in claim 2, wherein controlling the coalition of vehicles with common commands from the distributed agent system in response to feedback from sensors in each of the vehicles includes:

the commands execution component, in response to feedback of a non-critical problem, receiving a common command to take an action.

6. The system as claimed in claim 5, wherein the common command to take an action in response to the non-critical problem includes one or more of: stopping, slowing down, changing a trajectory, breaking the coalition, dividing the coalition, and other avoiding actions.

7. The system as claimed in claim 2, wherein controlling the coalition of vehicles with common commands from the distributed agent system in response to feedback from sensors in each of the vehicles includes:

the commands execution component, in response to feedback of a critical problem, receiving one of a common command and an individual command to break the coalition; and the vehicle's agent component resuming control.

8. The system as claimed in claim 1, wherein the role designation component designates one or more of: a surrounding component for projecting a surrounding of the coalition of vehicles, a trajectory component for computing a trajectory for the coalition of vehicles and individual vehicles, an acceleration component for computing acceleration for the coalition of vehicles and individual vehicles, a commands generation component for generating commands for each vehicle including their trajectory and acceleration.

9. The system as claimed in claim 1, wherein the safety unit instructing component for enabling an override of the coalition by the vehicle agent component in response to a breach of safety parameters is capable of immediately breaking the coalition and returning control to the vehicle's agent component.

10. A computer program product comprising a computer readable storage medium having program instructions embodied therewith, the program instructions executable by a processor to cause the processor to:

based on a set of parameters and goals for a vehicle having an agent component, negotiating with one or more other vehicles to form a coalition of vehicles with a set of common parameter values and common goals, wherein a coalition aims to achieve the common goals whilst respecting the common parameters;

synchronizing with the other vehicles in the coalition to result in a positioning of the vehicle in relation to the other vehicles in the coalition and to synchronize time;

combining the agent component of the vehicle with one or more agent components of the other vehicles in the coalition to form a distributed agent system;

controlling the coalition of vehicles with common commands from the distributed agent system without using a single vehicle controlling the coalition, and in response to feedback from sensors in each of the vehicles, wherein combining the agent component of the vehicle with the one or more agent components of the other vehicles in the coalition to form the distributed agent system includes:

designating a role for receiving designation of one or more processing roles of the distributed agent system and communicating with the other vehicle agent components regarding the role, the communicating with the other vehicle agent components regarding the role being authorized by a routing table indicative of dependency of the other vehicle agent components on the role; and enabling an override of the coalition by the vehicle agent component in response to a breach of safety parameters.

* * * * *